Jan. 28, 1941.   F. R. ELMORE   2,229,695
METHOD OF UNLOADING CAUSTIC
Filed Oct. 20, 1939
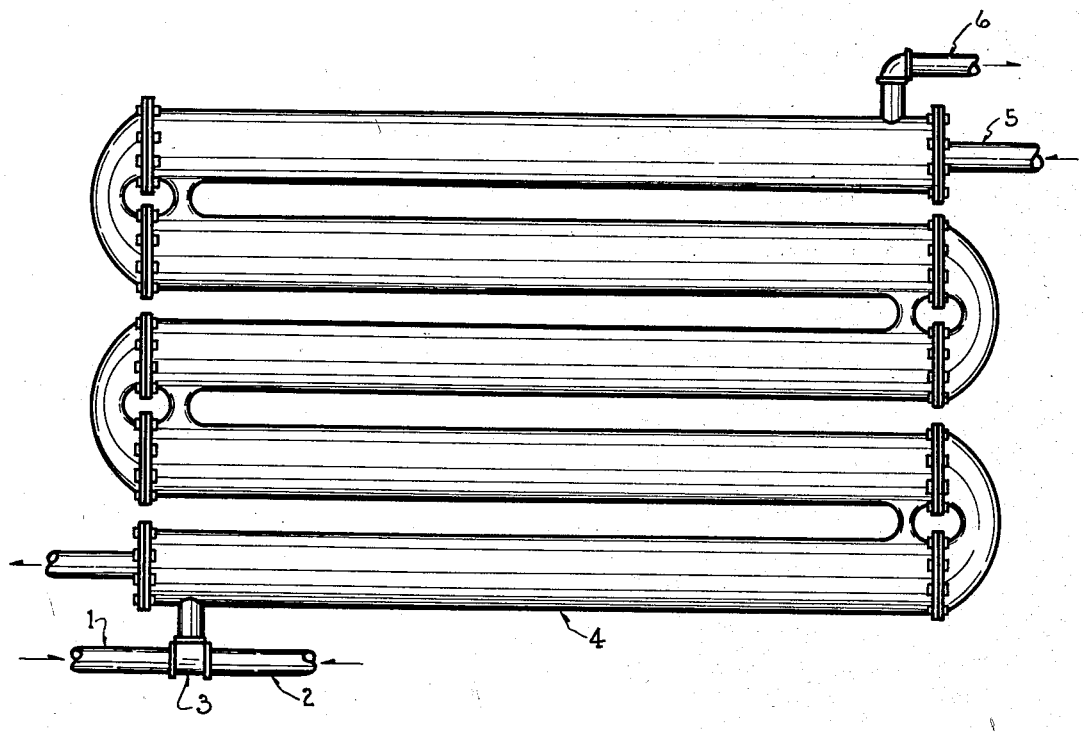
INVENTOR.
FRANK R. ELMORE
BY
ATTORNEY.

Patented Jan. 28, 1941

2,229,695

UNITED STATES PATENT OFFICE 2,229,695

METHOD OF UNLOADING CAUSTIC

Frank R. Elmore, Akron, Ohio, assignor to Pittsburgh Plate Glass Company, Allegheny County, Pa., a corporation of Pennsylvania Application October 20, 1939, Serial No. 300,396

1 Claim. (Cl. 23—293)

This invention relates to a method of unloading caustic solutions of high concentration from tank cars or storage tanks and is particularly related to a method of unloading solutions containing 65 to 80 percent by weight of sodium hydroxide. Solutions of this concentration are solid at atmospheric temperatures and in consequence it is the usual practice, to load and unload tank cars used in the shipment of such liquors at an elevated temperature, generally above 150° F., and often at 175–200° F. and to store the unloaded liquor in iron storage tanks. Since such solutions are very corrosive at high temperatures they often become seriously contaminated with metallic impurities during the unloading and storage thereof. Thus, it may occur that caustic of high purity which has been shipped to its destination in tank cars lined with a protective coating may become so contaminated during unloading and storing as to be unacceptable for many purposes.

In accordance with my invention, I have found that tank car or other tanks containing 65–80 percent sodium hydroxide solutions may be unloaded and the sodium hydroxide stored in metallic equipment without substantial metal pickup. I have found that substantial corrosion of the metallic storage tank or of the unloading equipment and consequent contamination of the solution may be minimized or eliminated by diluting the solution to a concentration below 55 percent by weight, whereupon the temperature rises materially usually to 200–250° F. and cooling the diluted liquor to 150° F. or below with sufficient rapidity to prevent an increase in the metal content in the solution to more than 0.002 percent and preferably not more than 0.001 percent, calculated on the amount of sodium hydroxide in the solution. In general, the solution should be cooled to 150° F. within 10 minutes after the solution is diluted and in most cases it is desirable to effect this cooling within 3 minutes. After dilution and cooling the caustic may be stored in metal equipment without material contamination of the solution. Thus, caustic of 70–75 percent concentration may be unloaded and stored in relatively pure form.

The process may be conducted in any convenient manner but preferably the unloading and dilution is conducted in a continuous process. The invention will be more fully understood by reference to the accompanying drawing, wherein a suitable method of operation in accordance with the present invention is diagrammatically illustrated.

In this embodiment I may provide a suitably jacketed cooler 4, to which is connected a mixing chamber or T 3, for dilution of the caustic. In the normal operation of this device caustic of high concentration containing for example 70–75 percent NaOH is removed from a tank car (not shown) at a temperature above 180° F. and is introduced into the system through inlet pipe 1. Sufficient water to dilute the solution to below 55 percent NaOH is introduced into pipe 2, and is mixed with the caustic in the mixing T 3, whereupon the temperature of the solution rises to a temperature well above 200° F. due to the heat of dilution. The caustic passes through the cooler countercurrently to cooling water introduced into water conduit 5, and the rates of flow of caustic and water are adjusted so that the temperature of the caustic solution emerging from the cooler through pipe 6, is not in excess of 150° F. and that the caustic does not remain at a temperature above 150° F. for a period substantially longer than 10 minutes after dilution of the solution. The cooled caustic is then discharged into metallic storage tanks not shown.

The rate of introduction of the caustic into the cooler is dependent upon the cooling capacity of the cooler and the temperature of the cooling water. Water cooled to about 32° F. is generally satisfactory. It is found that by effecting the cooling rapidly, generally within a period of not more than 10 minutes and preferably about 3 minutes after dilution, no substantial contamination of the caustic occurs. Thus, caustic containing 0.0002 percent iron on the anhydrous basis may be unloaded, diluted and stored in iron equipment without increasing the iron content to more than 0.0004 percent and often no iron pickup is noted. It should be understood that the process is not limited to any specific method of diluting or cooling and that the process may be conducted continuously, in batches, or by other convenient method.

Although the present invention has been described with reference to the specific details of certain embodiments thereof, it is not intended that such details shall be regarded as limitations upon the scope of the invention except insofar as included in the accompanying claim.

I claim:

A method of diluting an aqueous solution of sodium hydroxide which contains about 70 to 75 percent of sodium hydroxide and not more than 0.001 percent iron which comprises diluting the solution while in liquid state to a concentration below about 55 percent concentration and cooling the diluted solution to below 150° F., within 3 minutes after the solution is diluted.

F. R. ELMORE.